United States Patent [19]

Rebhan et al.

[11] 4,039,515

[45] Aug. 2, 1977

[54] CONTINUOUS MANUFACTURE OF LINEAR POLYESTERS

[75] Inventors: Joerg Rebhan; Hans Georg Matthies, both of Ludwigshafen, Germany

[73] Assignee: BASF Aktiengesellschaft, Ludwigshafen, Germany

[21] Appl. No.: 619,812

[22] Filed: Oct. 6, 1975

[30] Foreign Application Priority Data

Oct. 16, 1974 Germany ............................ 2449162

[51] Int. Cl.² .............................................. C08G 63/16
[52] U.S. Cl. ............................. 260/75 M; 260/475 P
[58] Field of Search .......................... 260/75 M, 475 P

[56] References Cited

U.S. PATENT DOCUMENTS

| | | | |
|---|---|---|---|
| 2,793,235 | 5/1957 | Jenkinson ...................... | 260/75 M X |
| 3,050,533 | 8/1962 | Munro et al. ................. | 260/75 M X |
| 3,376,353 | 2/1968 | Tate .............................. | 260/75 M X |
| 3,444,140 | 5/1969 | Stewart et al. ................. | 260/75 M |
| 3,590,072 | 6/1971 | Leybourne ...................... | 260/475 P |
| 3,639,448 | 2/1972 | Matsuzawa et al. ............. | 260/475 P |

*Primary Examiner*—Lucille M. Phynes
*Attorney, Agent, or Firm*—Keil, Thompson & Shurtleff

[57] ABSTRACT

An improved process for the continuous manufacture of linear high molecular weight polyesters by direct esterification of terephthalic acid with excess glycols in a medium comprising terephthalic acid glycol esters or their oligomers, under superatmospheric pressure at temperatures above 200° C, followed by polycondensation in the presence of catalysts at from 260° to 290° C. The improvement is that the mixture fed to the esterification contains terephthalic acid and glycols in the molar ratio of 1:1.15 to 1:1.5 and that during the esterification from 20 to 30% by weight of the excess of glycols over the molar ratio terephthalic acid: glycols = 1:1 are continuously distilled from the reaction mixture.

9 Claims, No Drawings

CONTINUOUS MANUFACTURE OF LINEAR POLYESTERS

The present invention relates to a process for the continuous manufacture of linear polyesters by direct esterification of terephthalic acid with excess glycols in a medium comprising terephthalic acid glycol esters or their oligomers under superatomospheric pressure at temperatures above 200° C, followed by polycondensation in the presence of catalysts at from 260° to 290° C.

The direct esterification of terephthalic acid with glycols requires a very long time. By using the process disclosed in German Printed Application 1,024,713 it is possible to reduce the esterification time by including in the mixture at least 15% of terephthalic acid glycol esters. However, under these conditions the esterification still takes about 3 hours 30 minutes. In addition it is necessary to use a substantial excess of glycol, which promotes the formation of ethers and therefore detracts from the quality of the polyesters. It is true that polymers of higher quality, containing little ether and having a high melting point, are obtained by the process disclosed in German Printed Application No. 1,135,660, even when using a low excess of glycol. However, the requisite minimum esterification time of 100 minutes is still unsatisfactory for industrial purposes. Shorter times are allegedly achieved by the process disclosed in German Printed Application No. 1,520,426, in which a certain molar ratio of esterified terephthalic acid to total amount of glycol is maintained. However, the values quoted are difficult to realize in industrial operation. In particular, however, the process has the disadvantage that the reaction mixture has a very great tendency to foam, which is a serious handicap in industrial operation. Furthermore, the degree of conversion achieved is only 71.5%, based on terephthalic acid, and as a result the subsequent condensation to give high molecular weight polyesters again takes longer.

It is an object of the present invention to provide a process for the direct esterification of terephthalic acid, using a low an excess of glycols as possible, wherein the esterification takes place as rapidly as possible, with a high degree of conversion, and polymers of low ether content and high melting point are obtained.

We have found that this object is achieved and linear polyesters are obtained, more advantageously than hitherto, by continuous direct esterification of terephthalic acid with excess glycols in a medium of terephthalic acid glycol esters or their oligomers under superatmospheric pressure at temperatures above 200° C, followed by polycondensation in the presence of catalysts at from 260° to 290° C, if the mixture fed to the esterification contains terephthalic acid and glycols in the molar ratio of from 1:1.15 to 1:1.5 and during the esterification from 20 to 30% by weight of the excess of glycols over the molar ratio terephthalic:glycol = 1:1 are continuously distilled from the reaction mixture.

The new process has the advantage that the esterification is carried out rapidly, using a low excess of glycol and maintaining a high degree of conversion, and that high polymers of low ether content and high softening point are obtained.

In addition to terephthalic acid, other aliphatic or aromatic dicarboxylic acids or hydroxycarboxylic acids may be present. Aliphatic $\alpha,\omega$-dicarboxylic acids of 3 to 16 carbon atoms, especially of 4 to 8 carbon atoms, which apart from the carboxyl groups have a hydrocarbon structure, and aromatic dicarboxylic acids derived from benzene or naphthalene, eg. isophthalic acid, o-phthalic acid, naphthalenedicarboxylic acid and p-hydroxybenzoic acid, are particularly preferred. Up to 50 mole percent, and in particular 20 mole percent, based on terephthalic acid, of such additional dicarboxylic acids or hydroxycarboxylic acids may be used.

Particularly suitable glycols are aliphatic glycols of 2 to 10 carbon atoms which apart from the two hydroxyl groups have a hydrocarbon structure. Glycols of 2 to 6 carbon atoms, and in particular alkanediols of 2 to 4 carbon atoms, are particularly preferred. Ethylene glycol is of particular industrial importance.

It is an essential characteristic of the invention that the mixture fed to the esterification contains terephthalic acid, optionally together with other dicarboxylic acids, and glycols in the molar ratio of 1:1.15 to 1:1.5 and that during the esterification from 20 to 30 percent of the excess of glycol over the molar ratio of terephthalic acid (optionally together with other dicarboxylic acids): glycol = 1:1 is distilled continuously from the reaction mixture. It should be noted particularly that the excess glycol distilled off is not recycled directly but can, if necessary after removing the water of reaction, be reused for the preparation of the starting mixture of terephthalic acid and glycol.

In addition, a medium of terephthalic acid glycol esters or their oligomers is used. Of course, the glycol ester used corresponds to the glycol employed. The oligomers as a rule have a degree of polymerization of from 2 to 10. The amounts used are advantageously not less than 15 per cent by weight, preferably from 25 to 75 percent by weight — based on terephthalic acid (where relevant together with other dicarboxylic acids) — of terephthalic acid glycol esters or their oligomers. The use of equal amounts of terephthalic acid and the said glycol esters has proved particularly advantageous.

The esterification is carried out at temperature above 200° C, and temperatures of from 200° to 280° C have proved particularly suitable; temperatures of from 220° to 270° C are of particular importance in industrial practice. The esterification is carried out under superatmospheric pressure, as a rule of up to 15 bars, and pressures of from 5 to 10 bars have proved particularly suitable.

The addition of alkali metal oxides or hydroxides, or alkaline earth metal oxides or hydroxides, or of their basic salts, eg. potassium hydroxide, sodium hydroxide, calcium oxide, sodium terephthalate and calcium terephthalate, to the esterification mixture has also proved of value. Advantageously, from 0.5 to 1 percent by weight — based on terephthalic acid — of the hydroxides, oxides or salts is used.

The esterification is carried out continuously, ie., the starting mixture of terephthalic acid and glycol is fed to the esterification at the same rate as that at which the finished esterified mixture is taken off.

The esterification mixture thus obtained is then condensed at from 260° to 290° C to give the linear polyester of the desired degree of polycondensation. This stage is carried out under atmospheric pressure or, preferably, reduced pressure, eg. down to 0.1 mm Hg. In addition, condensation catalyst, eg. antimony, titanium, manganese and germanium salts, for example the acetates, or tetrabutyl ortho-titanate, are used, advantageously in amounts of from 0.1 to 0.1 percent by weight, based on end product.

The linear polyesters which may be obtained by the process of the invention can be used for the manufacture of filaments and fibers, films and injection moldings.

The Examples which follow illustrate the invention.

be polycondensed to a polyester which is suitable for spinning.

The spinnability of polycondensates of various origins is shown in the table which follows.

TABLE

| Experiment | Molar ratio of the starting materials TPA and ethylene glycol | f-value | Temperature | Solution time, minutes | Polycondensation | Relative viscosity |
|---|---|---|---|---|---|---|
| According to German Printed Application 1,520,426, Example 1 | 1 : 1.5 | 0.7 | 260–236° C | 38 (TPA incompletely dissolved) | 50 minutes, 280°, <1 mm Hg | 1.253, not spinnable |
| | | | | | 100 minutes, 280°, <1 mm Hg | 1.340, spinnable |
| According to Example 1 of the invention | 1 : 1.4 | 0.3 | 265° C | 45 | 50 minutes, 280°, <1 mm Hg | 1.335 spinnable |

The table shows that using the process of the invention a spinnable polycondensate is obtained in a shorter time.

EXAMPLE 1

Per minute, a mixture of 0.34 kg of terephthalic acid and 0.13 kg of ethylene glycol (molar ratio 1:1.4) is fed to a stirred autoclave of 70 l capacity, fitted with a reflux condenser (for partial condensation) and a descending condenser (for condensing the overhead product). The above mixture is mixed, in the weight ratio of 1:1, with oligomeric terephthalic acid glycol ester of degree of polymerization 2-3. A temperature of 265° C and a pressure of 8 bars are maintained in the stirred autoclave. 28% of the excess glycol, together with the water produced in the reaction, are distilled from the reaction mixture, a residence time of 45 minutes being maintained. The esterification product which is taken off continuously has a degree of conversion of 84%, based on terephthalic acid introduced, and contains 1.8 mole percent of diglycol. The mixture thus obtained in subjected to further condensation, after addition of 0.07 percent by weight of antimony triacetate, for 90 minutes at 285° C, whilst lowering the pressure from 760 to 0.1 mm Hg. The polyester thus obtained contains 2.2 mole percent of diglycol and melts at 252° C.

COMPARATIVE EXAMPLE 1

The procedure of Example 1 is followed except that only 15% excess glycol are distilled off. The polyester obtainable after further condensation contains 4.2 mole percent of diglycol and melts at 245° C.

COMPARATIVE EXAMPLE 2

A mixture of 83 g of TPA and 46.5 g of ethylene glycol is added gradually to 233 g of terephthalic acid glycol ester at 250°-260° C and the batch is kept at this temperature and atmospheric pressure, whilst stirring, until a clear reaction mixture has formed. The water liberated in the reaction is separated off continuously and the glycol which distills at the same time is completely recycled. The time required to achieve solution is, however, 135 minutes. The esterification product can

We claim:

1. In a process for the manufacture of linear high molecular weight polyesters by direct esterification of terephthalic acid with excess glycols in a medium comprising terephthalic acid glycol esters or their oligomers, under superatmospheric pressure at temperatures above 200° C, followed by polycondensation in the presence of catalysts at from 260° to 290° C, the improvement comprising: (a) feeding to the esterifiction a mixture which contains terephthalic acid and glycols in the molar ratio of 1:1.15 to 1:1.5, and (b) continuously distilling from the reaction mixture, during the esterification, from 20 to 30% by weight of the excess of glycol over the molar ratio terephthalic acid: glycol = 1:1.

2. A process as claimed in claim 1, wherein up to 50 mole percent, based on terephthalic acid, of $\alpha,\omega$-alkanedicarboxylic acids of 4 to 8 carbon atoms or aromatic dicarboxylic acids derived from benzene or naphthalene are also used.

3. A process as claimed in claim 1, wherein alkanediols of 2 to 4 carbon atoms are used.

4. The process as claimed in claim 1, wherein from 25 to 75% by weight of terephthalic acid glycol esters or their oligomers are present.

5. The process as claimed in claim 1, wherein the temperature is maintained at from 200° to 280° C during the esterification.

6. A process as claimed in claim 1, wherein the esterification is carried out under a pressure of from 5 to 10 bars.

7. A process as claimed in claim 1, wherein from 0.05 to 1% by weight, based on terephthalic acid, of potassium hydroxide, sodium hydroxide, calcium oxide, sodium terephthalate or calcium terephthalate are present during the esterification.

8. A process as claimed in claim 1, wherein the polycondensation is carried out under reduced pressure.

9. A process as claimed in claim 1, wherein the polycondensation is carried out in the presence of from 0.01 to 1% by weight, based on the polyester, of an antimony, titanium, magnesium and/or germanium salt.

* * * * *